United States Patent
Someya et al.

(10) Patent No.: US 9,665,105 B2
(45) Date of Patent: May 30, 2017

(54) FLOW RATE CONTROLLING VALVE (71) Applicant: Azbil Corporation, Tokyo (JP)

(72) Inventors: Hideaki Someya, Tokyo (JP); Hiroaki Narita, Tokyo (JP); Makoto Saruwatari, Tokyo (JP); Tomofumi Ohashi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 15/086,130

(22) Filed: Mar. 31, 2016

(65) Prior Publication Data
US 2016/0291606 A1 Oct. 6, 2016

(30) Foreign Application Priority Data

Mar. 31, 2015 (JP) ................................. 2015-071279

(51) Int. Cl.
| F16K 31/02 | (2006.01) |
|---|---|
| G05D 7/06 | (2006.01) |
| F16K 31/04 | (2006.01) |
| F24F 5/00 | (2006.01) |
| F16K 37/00 | (2006.01) |

(52) U.S. Cl.
CPC ............ *G05D 7/0635* (2013.01); *F16K 31/04* (2013.01); *F16K 37/005* (2013.01); *F16K 37/0091* (2013.01); *F24F 5/0003* (2013.01)

(58) Field of Classification Search
CPC .... F16K 37/0091; F16K 37/005; F16K 31/04; G05D 7/0635; F24F 5/0003; Y10T 137/776; Y10T 137/7761; Y10T 137/7762

USPC .. 137/487, 487.5, 489, 488, 315.22, 601.17; 251/281

See application file for complete search history.

(56) References Cited

U.S. PATENT DOCUMENTS 4,796,651 A * 1/1989 Ginn .................... G01F 1/22
                                          137/487
5,190,068 A * 3/1993 Philbin ................ G01F 15/024
                                          137/486

(Continued)

FOREIGN PATENT DOCUMENTS

| JP | H06-272935 A | 9/1994 |
|---|---|---|
| JP | H08-247323 A | 9/1996 |

(Continued)

*Primary Examiner* — Kevin Murphy
*Assistant Examiner* — Minh Le
(74) *Attorney, Agent, or Firm* — Troutman Sanders LIP (57) ABSTRACT

A table indicating a relationship between a differential pressure across a valve unit and a torque that is to be outputted by a motor (an output torque) is stored in a table storing portion. A valve opening controlling portion and a torque controlling portion are provided in a controlling portion. The valve opening controlling portion uses the actual opening θpv, from the valve opening detector, as the valve opening measured value, and sends a driving command to the motor so as to cause the valve opening measured value θpv to match the valve opening setpoint θsp. The torque controlling portion acquires, from the table, a torque corresponding to the differential pressure ΔP across the valve unit, detected by the differential pressure detecting portion, and sends, to the motor, a command (a torque output command) to cause outputting of the torque that has been acquired.

7 Claims, 7 Drawing Sheets

(56) References Cited

U.S. PATENT DOCUMENTS

| | | | | |
|---|---|---|---|---|
| 5,197,328 A * | 3/1993 | Fitzgerald | F16K 37/0091 | 137/487.5 |
| 5,234,021 A * | 8/1993 | Kozlak | G01F 1/40 | 137/487 |
| 5,251,148 A * | 10/1993 | Haines | G05D 7/0635 | 137/487.5 |
| 5,351,705 A * | 10/1994 | Reinders | G05D 16/2026 | 137/12 |
| 5,431,182 A * | 7/1995 | Brown | G05B 6/05 | 137/487.5 |
| 5,460,196 A * | 10/1995 | Yonnet | G05D 16/2093 | 137/12 |
| 5,532,922 A * | 7/1996 | Wacker | G05D 7/0635 | 700/282 |
| 6,725,167 B2 * | 4/2004 | Grumstrup | G05D 7/0635 | 137/487.5 |
| 6,892,745 B2 * | 5/2005 | Benson | G01F 1/363 | 137/1 |
| 7,025,088 B2 * | 4/2006 | Saunders | F01D 17/08 | 137/488 |
| 7,096,093 B1 * | 8/2006 | Hansen | G05D 7/005 | 700/282 |
| 7,174,777 B2 * | 2/2007 | Fischer | F02B 37/013 | 73/114.33 |
| 8,109,289 B2 * | 2/2012 | Trnka | F24D 19/1015 | 137/487 |
| 8,365,761 B2 * | 2/2013 | Bleile | F02D 9/1065 | 137/400 |
| 8,429,951 B2 * | 4/2013 | Puttmer | F16K 37/0091 | 73/40.5 A |
| 9,400,004 B2 * | 7/2016 | Monkowski | F15D 1/025 | |
| 2002/0117214 A1 * | 8/2002 | Tucker | G05D 16/2053 | 137/487.5 |
| 2005/0016592 A1 * | 1/2005 | Jeromson | F16K 3/08 | 137/487.5 |
| 2005/0115612 A1 * | 6/2005 | Tanaka | G01F 1/26 | 137/486 |
| 2009/0120515 A1 * | 5/2009 | Ohtani | F16K 1/32 | 137/553 |
| 2014/0067135 A1 * | 3/2014 | Lehnert | F16K 31/042 | 700/276 |
| 2014/0090723 A1 * | 4/2014 | Toale | F02M 21/0239 | 137/487.5 |
| 2015/0176718 A1 * | 6/2015 | Zhuo | F16K 31/05 | 137/1 |

FOREIGN PATENT DOCUMENTS

| | | |
|---|---|---|
| JP | H11211191 A | 8/1999 |
| JP | 2008-151293 A | 7/2008 |
| JP | 2009-033913 A | 2/2009 |
| JP | 2009-245096 A | 10/2009 |

\* cited by examiner

FLOW RATE CONTROLLING VALVE

CROSS-REFERENCE TO RELATED APPLICATION

The present application claims priority to Japanese Patent Application No. 2015-071279 filed Mar. 31, 2015. This application is incorporated herein by reference in its entirety.

FIELD OF TECHNOLOGY

The present invention relates to a flow rate controlling valve for controlling a flow rate of a fluid flowing in a flow path.

BACKGROUND

Conventionally, there have been air conditioning controlling systems that control flow rates of hot and cold water to an air conditioner (referencing, for example,] Japanese Unexamined Patent Application Publication H11-211191 and Japanese Unexamined Patent Application Publication H06-272935). In these air conditioning controlling systems, flow rate controlling valve are provided in the supply routes for hot water/cold water to the air conditioner, where the valve unit within the flow rate controlling valve is driven to adjust the amount of opening of the flow path through which the hot/cold water flows.

Normally, in a flow rate controlling valve, an opening setting (a valve opening setpoint) is inputted from the air conditioning controlling device, and with the actual opening of the valve unit, detected by a valve opening detector, as a valve opening a measured value, the valve unit is driven so as to cause the valve opening measured value to match the valve opening setpoint. As a result, a fluid will flow in the flow path in which the flow rate controlling valve is equipped, flowing with a desired flow rate that has been provided as the valve opening setpoint. Such a flow rate controlling valve is known as an "opening control-type flow rate controlling valve."

On the other hand, in recent years there have been flow rate controlling valves wherein a function for measuring the actual flow rate of the fluid that flows within the flow path has been added to the flow rate controlling valve itself, where a flow rate setting (a flow rate setpoint) corresponding to the conventional opening setting (the valve opening setpoint) has been sent from the air conditioning controlling device, and the driving of the valve unit is controlled within the flow rate controlling valve so as to cause the flow rate setting (the flow rate setpoint) that has been received and the actual flow rate (the measured value for the flow rate) to match. As a result, the fluid within the flow path wherein the flow rate controlling valve is installed will flow at the desired flow rate, which has been provided as the flow rate setpoint. Such a flow rate controlling valve is known as a "flow rate control-type flow rate controlling valve."

For example, Japanese Unexamined Patent Application Publication 2009-245096 discloses a flow rate controlling valve comprising a motor that rotates a valve rod that is connected to a valve unit, a valve opening detector for detecting the actual opening of the valve unit, from the rotational position of the valve rod, and an actual flow rate measuring portion (actual flow rate calculating portion) for calculating the actual flow rate based on the differential pressure across the valve unit. In the flow rate controlling valve disclosed in Japanese Unexamined Patent Application Publication 2009-245096, when in an opening controlling mode, the amount of rotation of the valve rod by the motor is controlled so as to cause the valve opening measured value to match the valve opening setpoint, where the valve opening measured value is the actual opening of the valve unit detected by the valve opening detector, and when in a flow rate controlling mode, the amount of rotation of the valve rod by the motor is controlled so as to cause the measured value for the flow rate to match the flow rate setpoint, where the measured value of the flow rate is the actual flow rate calculated by the actual flow rate measuring portion (the actual flow rate calculating portion).

However, typically, in a flow rate controlling valve of a type wherein a valve rod, which is connected to the valve unit, is driven by a motor, the load torque will vary depending on the degree of opening. The load torque will be at a maximum in a nearly fully-closed state, wherein the differential pressure is at a maximum, based on a constant flow rate for the inflow from the primary side of the flow path of the valve, and the differential pressure will decrease as the valve begins to open from there, with the load torque decreasing commensurately.

On the other hand, because electric actuators for driving valves are designed with output torques (the torque generated by the motor, the gear reduction ratio, and the like) matching the maximum load torque on the valve side (that is, the load torque when the valve is nearly fully close), if the design is with, for example, a low-power motor and a gear mechanism with a high reduction ratio, then, in order to satisfy the load torque when the valve is nearly fully closed, the operating speed will have to be slow across the entire scope of valve opening, and thus the time required for operation will be too long and the controllability will be poor. On the other hand, when a high-power motor (combined with a gear mechanism with a low reduction ratio) is used, then although the time for the operation will be short, there will be surplus torque when the valve is near the fully open position, which would increase the cost of the motor.

Note that there are a large number of technologies for switching the power depending on the torque, and the like (referencing, for example, Japanese Unexamined Patent Application Publication 2008-151293), where mechanisms are provided for switching the power transmission depending on the torque, but this leads to concerns about the complexity of the mechanisms and about increases in size. Moreover, while there are also technologies for controlling the power of the motor depending on the load torque on the motor (referencing, for example, Japanese Unexamined Patent Application Publication 2009-33913), these require complex control circuits that are dedicated to torque control, for example, load torque detecting circuits, which increases costs. Moreover, in the flow rate controlling valve disclosed in Japanese Unexamined Patent Application Publication H8-247323, even though the opening information is used to increase the torque to the large torque that is required when the valve is in the nearly fully closed position, this produces the possibility of supplying excess torque in other areas of the opening, such as when partially opened. Producing excess torque results in wasted electrical power.

The present invention was created in order to solve these issues, and the object thereof is to provide a flow rate controlling valve able to supply the appropriate torque across the entirety of the opening range, doing so at a low cost, without a complex structure.

SUMMARY

In order to achieve the object set forth above, the present invention is a flow rate controlling valve comprising: a valve unit for adjusting the amount of opening of a flow path through which a fluid flows; a valve rod that is linked to the valve unit; a driving portion for driving the valve rod; a differential pressure detecting portion for detecting, as a differential pressure across the valve unit, a differential pressure between a pressure of a fluid on a primary side of the valve unit and a pressure of a fluid on a secondary side of the valve unit; a differential pressure-torque storing portion for storing a relationship between a differential pressure across the valve unit and a torque that is to be outputted by the driving portion; a drive quantity controlling portion for controlling a drive quantity for the valve rod by the driving portion so that a fluid with a desired flow rate will flow within the flow path; and a driving torque controlling portion for calculating a torque corresponding to a differential pressure across a valve unit, detected by the differential pressure detecting portion, from a relationship stored in the differential pressure-torque storing portion, to control a driving torque of the valve rod by the driving portion so as to output this torque. Given the present invention, a differential pressure between the pressure of the fluid on the primary side of the valve unit and the pressure of the fluid on the secondary side is detected, and the torque corresponding to the detected differential pressure across the valve unit is calculated from a relationship that is stored in a differential pressure-torque storing portion, and the driving torque of the valve rod is controlled by the driving portion so as to output this torque.

That is, in the present invention, when, for example, a motor is used for the driving portion, the output torque of the motor (the driving torque for the valve rod) is controlled by the differential pressure information for the valve (the differential pressure), rather than the torque variation of the valve (the valve unit). In a valve, the load torque that is required will vary depending on the differential pressure. Given this, in the present invention, the optimal torque is provided by controlling the driving torque of the valve rod, by the driving portion, depending on the differential pressure, based on the differential pressure information for the valve. Doing so enables the appropriate torque to be supplied across the entirety of the opening range at a low cost, without having to provide a mechanism for switching the power transmission depending on the torque, and without having to provide a complex controlling circuit that is dedicated to torque control, such as for detecting the load torque.

In the present invention, if the driving portion is a motor, preferably the motor used is able to vary the output torque by varying the electric current or voltage. For example, motors that use brushless DC motors, stepping motors, or the like, can be listed as typical examples.

In the present invention, the relationship between the differential pressures across the valve unit and the torques that are to be outputted by the driving portion is stored in the differential pressure-torque storing portion, and this may also be combined with the degree of opening of the valve unit. That is, relationships between the differential pressures across the valve unit, the degrees of opening of the valve unit, and the torques that are to be outputted by the driving portion may be stored in the pressure-torque storing portion. In this case, a valve opening detector is provided for detecting the actual opening of the valve unit from the driving position of the valve rod, and the torque is calculated from the relationships stored in the differential-pressure torque storing portion, corresponding to the differential pressure across the valve unit, detected by the differential pressure detecting portion, and the actual degree of opening of the valve unit, detected by the valve opening detector, and the driving torque on the valve rod by the driving portion is controlled so as to output this torque.

Moreover, in the present invention, while the drive quantity controlling portion controls the amount with which the valve rod is driven by the driving portion so as to cause the fluid to flow with the desired flow rate within the flow path, a flow rate controlling method may be used or an opening controlling method may be used in controlling the amount with which the valve rod is driven.

When this flow rate controlling method is employed, an actual flow rate calculating portion for calculating the actual flow rate of the fluid that flows in the flow path, based on the differential pressure across the valve unit, detected by the differential pressure detecting portion, is provided, and the amount with which the valve rod is driven by the driving portion is controlled so as to cause the actual flow rate calculated by the actual flow rate calculating portion (the measured value for the flow rate) to match the flow rate setpoint.

When this opening control method is used, a valve opening detector is provided for detecting the actual opening of the valve unit from the driving position of the valve rod, and the amount by which the valve rod is driven by the driving portion is controlled so that the actual opening of the valve unit, detected by the valve opening detector (the valve opening measured value) will match the valve opening set point.

Moreover, the flow rate controlling valve in the present invention may be a rotary valve, or may be a direct-acting valve instead. With a rotary valve, the rotational position of the valve unit will vary in accordance with the rotation of the valve rod, where the flow rate of the fluid that passes through the window portion will vary in accordance with the rotational position of the valve unit. In a direct-acting valve, the size of the gap between the flow path and the valve unit will vary in accordance with a reciprocating operation of the valve rod, and the flow rate of the fluid that passes through this gap between the flow path and the valve unit will vary in accordance with the size of this gap.

In the present invention, the relationship with between the differential pressures across the valve unit and the torques that are to be outputted by the driving portion is stored, and the torque corresponding to the differential pressure across the valve unit, detected by the differential pressure detecting portion, is calculated based on the stored relationship, to control the torque with which the valve rod is driven by the driving portion, to thereby output this torque, thus enabling the appropriate torque to be provided across the entirety of the opening range, doing so at a low cost, without a complex structure.

DETAILED DESCRIPTION

Figure 1:
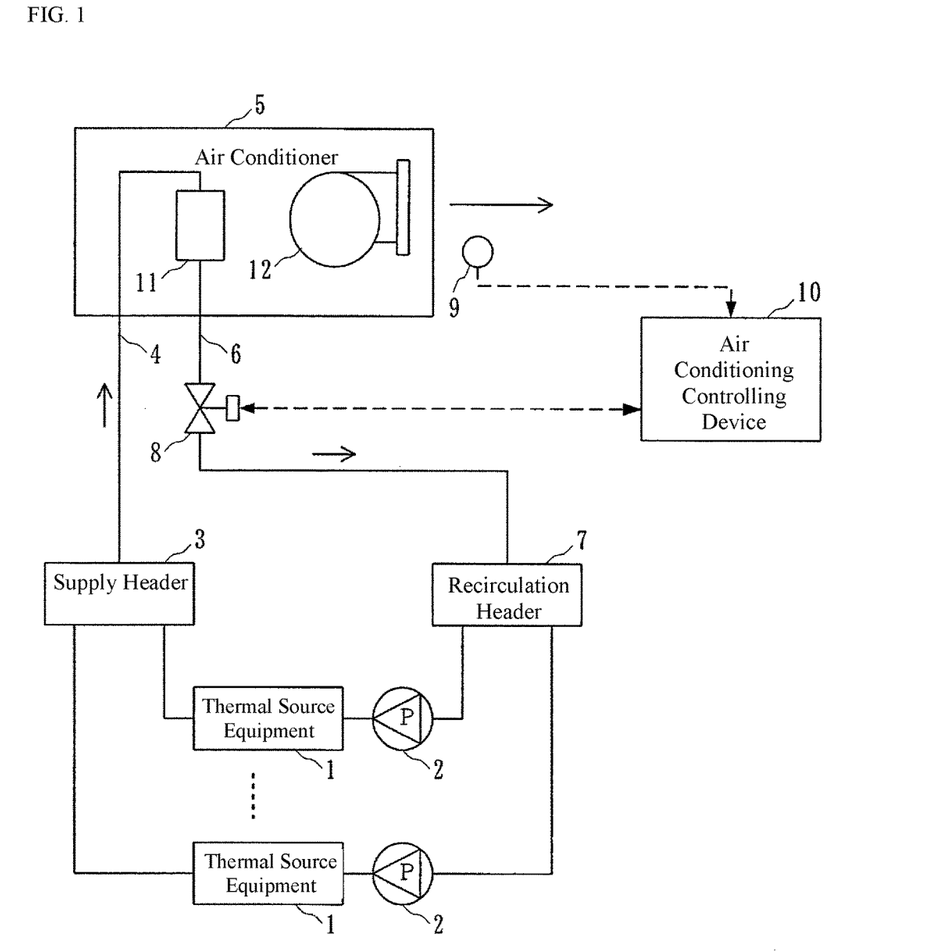
FIG. 1 is an instrumentation diagram illustrating an example of an air conditioning controlling system that uses a flow rate controlling valve according to the present invention.

An example according to the present disclosure will be explained below in detail, based on the drawings. FIG. 1 is an instrumentation diagram illustrating an example of an air conditioning controlling system that uses a flow rate controlling valve according to the present invention.

In FIG. 1, 1 is thermal source equipment for producing hot/cold water; 2 is a pump for pumping hot/cold water produced by the thermal source equipment 1; 3 is a supply header for mixing hot/cold water from a plurality of thermal source equipment; 4 is a supply water pipeline; 5 is an air conditioner that receives a supply of hot/cold water that is fed from the supply header 3 through the supply water pipeline 4; 6 is a recirculating pipeline; 7 is a recirculation header for returning the hot/cold water that has undergone heat exchange in the air conditioners 5 and that has been fed through the recirculating pipeline 6; 8 is a flow rate controlling valve for controlling the flow rate of the hot/cold water supplied to the air conditioner 5 from the supply header 3; 9 is a supply air temperature sensor for measuring the temperature of the supply air that is blown out from the air conditioner 5; 10 is an air conditioning control device; 11 is a coil of the air conditioner 5, and 12 is a blower.

In this air conditioning controlling system, hot/cold water that has been pumped by the pump 2 and to which a calorific value has been applied through the thermal source equipment 1 is mixed in the supply header 3, and supplied to the air conditioner 5 through the supply water pipeline 4, to pass through the air conditioner 5 and to arrive, as return water, at the recirculation header 7 through the recirculating pipeline 6, to be pumped again by the pump 2, to recirculate through the path described above. For example, in the case of a cooling operation, cold water is produced by the thermal source equipment 1, and this cold water is circulated. In the case of a heating operation, hot water is produced by the thermal source equipment 1, and this hot water is circulated.

The air conditioner 5 cools or heats, through passing hot/cold water through the coil 11, a mixture of outside air and air that has been returned (termed "recirculated air"), that has been returned from the controlled area by the air conditioning controlling system, and this cooled or heated air is sent to the controlled area as supply air through a blower 12. The air conditioner 5 is a single-type air conditioner that uses the same coil 11 for both cooling operations and heating operations, where a flow rate controlling valve according to the present invention is provided, as the flow rate controlling valve 8, in the recirculating pipeline 6 for the hot/cold water that is recirculated within the air conditioner 5.

EXAMPLE

Figure 2:
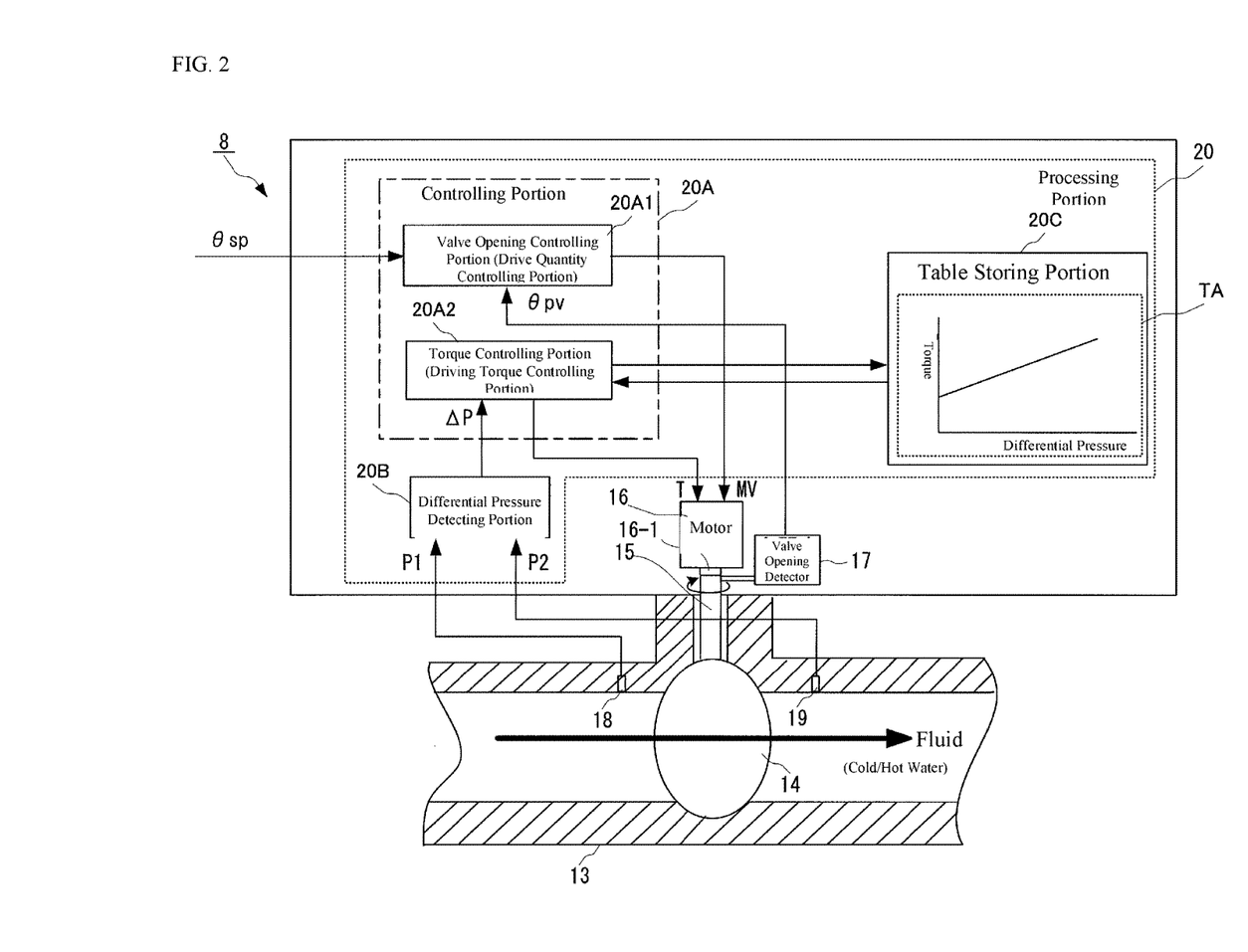
FIG. 2 is a diagram illustrating critical portions of an example \) of a flow rate controlling valve used in this air conditioning controlling system.

FIG. 2 is a diagram illustrating critical portions of the flow rate controlling valve 8 that is used in this air conditioning controlling system. The flow rate controlling valve 8 is provided with: a pipeline 13 that forms a flow path into which flows the hot/cold water that passes through the air conditioner 5; a valve unit 14 for adjusting the flow rate of the fluid that flows in the pipeline 13 (for adjusting the degree of opening of the flow path); a valve rod 15 that is linked to the valve unit 14; a motor 16 that rotates this valve rod 15; a valve opening detector 17 for detecting an actual opening θpv of the valve unit 14 from the rotational position of the valve rod 15 that is connected to a driveshaft 16-1 of the motor 16 (that is, the rotational position in the vicinity of the driveshaft 16-1); a primary side pressure sensor 18 for detecting, as a primary pressure P1, the pressure of the fluid on the primary side of the valve unit 14 within the pipeline 13; a secondary side pressure sensor 19 for detecting, as a secondary pressure P2, the pressure of the fluid on the secondary side of the valve unit 14 within the pipeline 13; and a processing portion 20.

The processing portion 20 is provided with a controlling portion 20A, a differential pressure detecting portion 20B, and a table storing portion 20C. The controlling portion 20A is provided with a valve opening controlling portion 20A1 and a torque controlling portion 20A2.

The differential pressure detecting portion 20B inputs the primary pressure P1 of the fluid from the primary side pressure sensor 18 and the secondary pressure P2 of the fluid from the secondary side pressure sensor 19 to detect the differential pressure between the primary pressure P1 and the secondary pressure P2 as the differential pressure ΔP across the valve unit 14. Note that a differential pressure sensor may be provided instead of the primary side pressure sensor 18 and the secondary side pressure sensor 19, to enable the differential pressure ΔP to be detected directly using the differential pressure sensor.

A table TA indicating the relationship between the differential pressures across the valve unit 14 and the torques that are to be outputted by the motor 16 (the output torque) is stored in the table storing portion 20C. This relationship between the differential pressures across the valve unit 14 and the torques that are to be outputted by the motor 16 are determined experimentally.

Moreover, a motor capable of varying the output torque, through varying the current or voltage, is used for the motor 16. For example, a brushless DC motor or a stepping motor, or the like, may be used for the motor 16.

Moreover, in the present example, the processing portion 20 may be achieved through hardware comprising a processor and a storage device and a program that achieves the various types of functions in cooperation with this hardware.

The distinctive processing operations in this flow rate controlling valve 8 will be explained below, focusing on the functions of the valve opening controlling portion 20A1 and the torque controlling portion 20A2 within the controlling portion 20A of the processing portion 20.

Note that, in this example, an opening setting (a valve opening setpoint) θsp that can assume values between 0 and 100% is applied to the flow rate controlling valve 8 by the air conditioning controlling device 10 so as to maintain the temperature of the controlled area at a set temperature.

In the flow rate controlling valve 8, the valve opening setpoint θsp from the air conditioning controlling device 10 is applied to the valve opening controlling portion 20A1. The valve opening controlling portion 20A1 uses the actual opening θpv, from the valve opening detector 17, as the valve opening measured value, and sends a driving command MV to the motor 16 so as to cause the valve opening measured value θpv to match the valve opening setpoint θsp.

Through this, the valve rod 15 is rotated together with the valve unit 14 to cause the valve opening measured value for θpv to match the valve opening setpoint θsp, so that a fluid with the desired flow rate, as instructed through the valve opening setpoint θsp, will flow through the pipeline (flow path) 13.

Moreover, when the opening of the valve unit 14 is controlled by this valve opening controlling portion 20A1 (that is, when the amount of rotation of the valve rod 15 is controlled), the output torque of the motor 16 is controlled by the torque controlling portion 20A2.

At this time, the torque controlling portion 20A2 acquires, from the table TA, which stores, in the table storing portion 20C, the torque that corresponds to the differential pressure ΔP across the valve unit 14, detected by the differential pressure detecting portion 20B, and sends, to the motor 16, a command (a torque output command) T so as to output this torque that has been acquired.

As a result, the output torque of the motor 16 is controlled so that the valve rod 15 will rotate with the appropriate torque in accordance with the differential pressure ΔP across the valve unit 14 at that time.

In this way, when, in the present example, the amount of rotation of the valve rod 15 is controlled by the valve opening controlling portion 20A1, the output torque of the motor 16 (the driving torque for the valve rod 15) is controlled so as to be the appropriate torque depending on the differential pressure ΔP across the valve unit 14 at that time.

The result is the ability to supply the appropriate torque across the entirety of the opening range, doing so at a low cost without having to provide a mechanism for switching the power transmission depending on the torque and without having to provide complex controlling circuitry that is dedicated to torque control, such as for detecting the load torque.

In this example, the valve opening controlling portion 20A1 in the controlling portion 20A corresponds to the drive quantity controlling portion in the present invention, and the torque controlling portion 20A2 corresponds to the driving torque controlling portion.

Another Example

In the example illustrated in FIG. 2 (the previous Example), a valve opening controlling portion 20A1 was provided in the controlling portion 20A, and a driving command MV was sent to the motor 16 to cause the valve opening measured value θpv to match the valve opening setpoint θsp.

Figure 3:
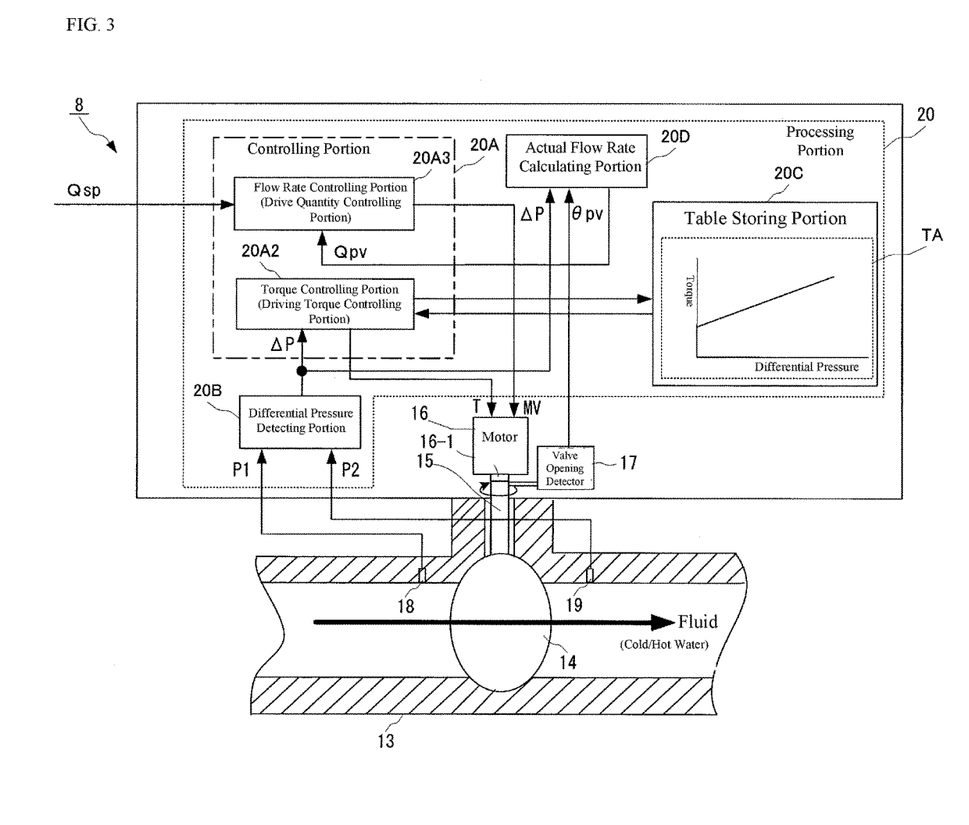
FIG. 3 is a diagram illustrating critical portions of a flow rate controlling valve of a another example.

In contrast, in this Example, an actual flow rate calculating portion 20D is provided in the processing portion 20, as illustrated in FIG. 3, and a flow rate controlling portion 20A3 is provided instead of the valve opening controlling portion 20A1 in the controlling portion 20A.

In the processing portion 20, the actual flow rate calculating portion 20D inputs the differential pressure ΔP across the valve unit 14, detected by the differential pressure detecting portion 20B, and the actual opening θpv of the valve unit 14, detected by the valve opening detector 17, and substitutes the inputted front and back differential pressure ΔP across the valve unit 14 and the actual opening θpv of the valve unit 14 into a prescribed flow rate calculating formula, to calculate the actual flow rate Qpv of the fluid that flows in the pipeline 13.

In the controlling portion 20A, the flow rate controlling portion 20A3 uses the actual flow rate Qpv of the fluid that flows in the pipeline 13, calculated by the actual flow rate calculating portion 20D, as the measured value for the flow rate, and sends, to the motor 16, a driving command MV to cause this measured value Qpv for the flow rate to match a flow rate setpoint Qsp from the air conditioning controlling device 10.

Through this, the valve rod 15 is rotated together with the valve unit 14 to cause the measured value Qpv of the flow rate to match the flow rate setpoint Qsp, to cause a fluid to flow within the pipeline (flow path) 13 with the desired flow rate, as instructed as the flow rate setpoint Qsp.

Moreover, when the flow rate is controlled by the flow rate controlling portion 20A3 (when the amount of rotation of the valve rod 15 is controlled), the torque controlling portion 20A2 controls the output torque of the motor 16 in the same manner as in the first example.

That is, the torque controlling portion 20A2 acquires, from the table TA, which stores, in the table storing portion 20C, the torque that corresponds to the differential pressure ΔP across the valve unit 14, detected by the differential pressure detecting portion 20B, and sends, to the motor 16, a command (a torque output command) T so as to output this torque that has been acquired.

As a result, the output torque of the motor 16 is controlled so that the valve rod 15 will rotate with the appropriate torque in accordance with the differential pressure ΔP across the valve unit 14 at that time.

In this way, when, in the present example, the amount of rotation of the valve rod 15 is controlled by the flow rate controlling portion 20A3, the output torque of the motor 16 (the driving torque for the valve rod 15) is controlled so as to be the appropriate torque depending on the differential pressure ΔP across the valve unit 14 at that time.

The result is the ability to supply the appropriate torque across the entirety of the opening range, doing so at a low cost without having to provide a mechanism for switching the power transmission depending on the torque and without having to provide complex controlling circuitry that is dedicated to torque control, such as for detecting the load torque.

In this example, the flow rate controlling portion 20A3 in the controlling portion 20A corresponds to the drive quantity controlling portion in the present invention, and the torque controlling portion 20A2 corresponds to the driving torque controlling portion.

Further Example

In the example illustrated in FIG. 2 (the previous Example), a table TA indicating the relationship between the differential pressures across the valve unit 14 and the torques that are to be outputted by the motor 16 (the output torque) was stored in the table storing portion 20C.

Figure 4:
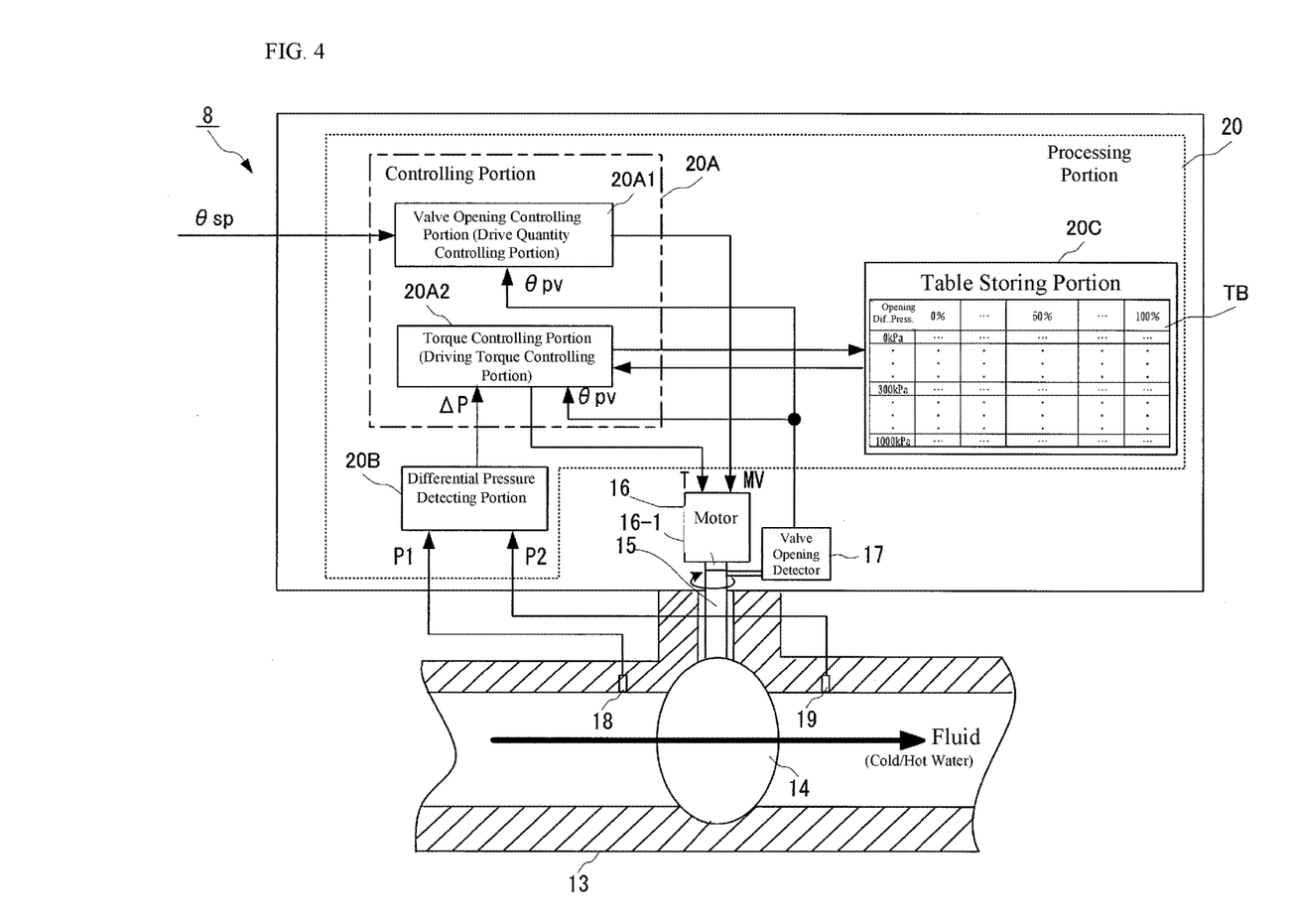
FIG. 4 is a diagram illustrating critical portions of a flow rate controlling valve of a further example.

In contrast, in this example, illustrated in FIG. 4, a table TB indicating the torques that are to be outputted by the motor 16 (the output torque) in accordance with the combination of the differential pressures across the valve unit 14 and the opening of the valve unit 14 is stored in the table storing portion 20C.

In this example, when the opening of the valve unit 14 is controlled by the valve opening controlling portion 20A1 (when the amount of rotation of the valve rod 15 is controlled), the torque controlling portion 20A2 acquires, from the table TB, which stores, in the table storing portion 20C, the torque that corresponds to the differential pressure ΔP across the valve unit 14, detected by the differential pressure detecting portion 20B, and the degree of opening θpv of the valve unit 14, detected by the valve opening detector 17, and sends, to the motor 16, a command (a torque output command) T so as to output this torque that has been acquired.

As a result, the output torque of the motor 16 is controlled so that the valve rod 15 will rotate with the appropriate torque in accordance with the differential pressure ΔP across the valve unit 14 and the degree of opening θpv of the valve unit 14 at that time.

Yet Further Example

In the example illustrated in FIG. 3 (the other Example), a table TA indicating the relationship between the differential pressures across the valve unit 14 and the torques that are to be outputted by the motor 16 (the output torque) was stored in the table storing portion 20C.

Figure 5:
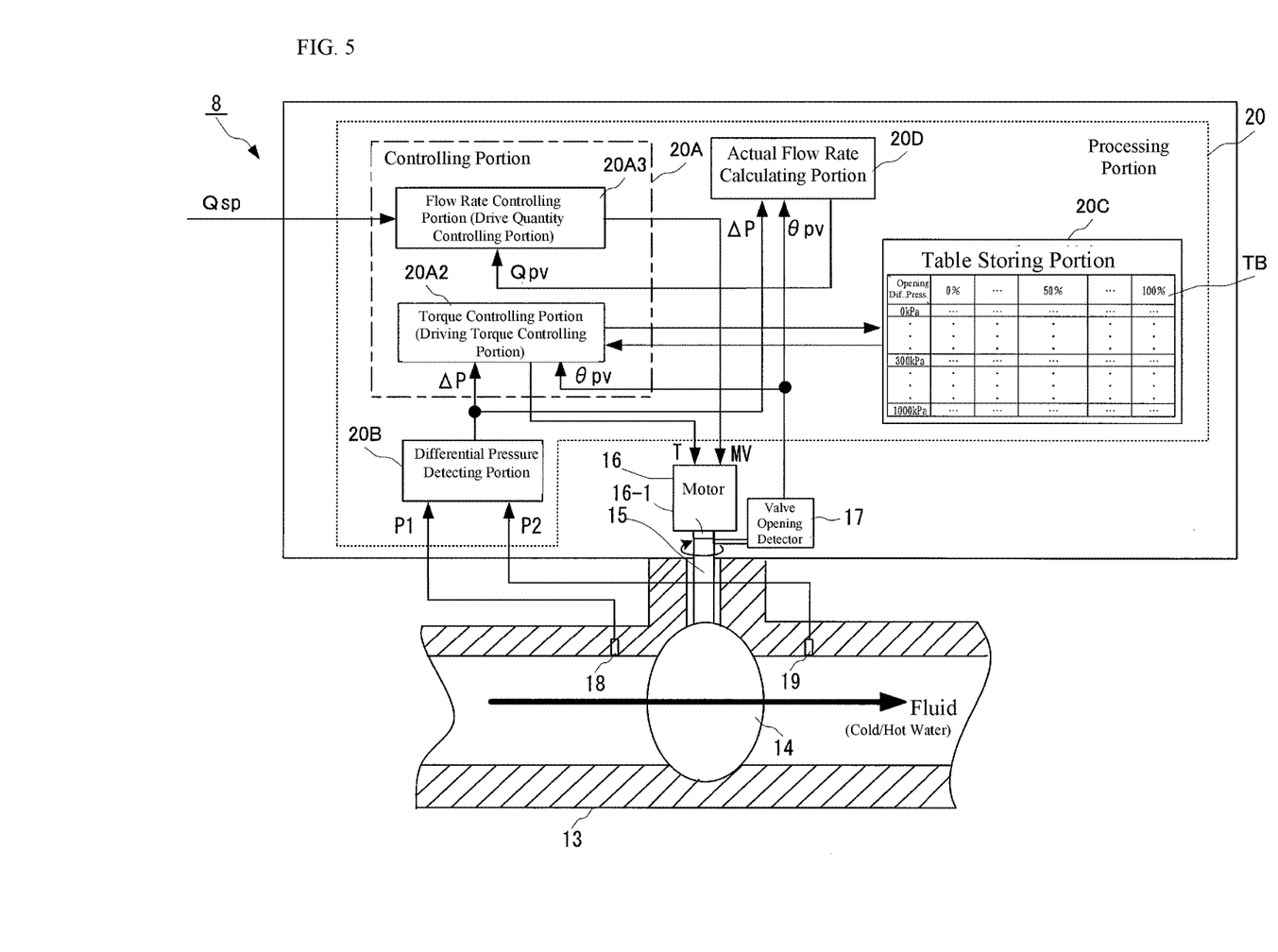
FIG. 5 is a diagram illustrating critical portions of a flow rate controlling valve of a yet further example.

In contrast, in this example, illustrated in FIG. 5, as with the above example, a table TB indicating the torques that are to be outputted by the motor 16 (the output torque) in accordance with the combination of the differential pressures across the valve unit 14 and the opening of the valve unit 14 is stored in the table storing portion 20C.

In this example, when the flow rate is controlled by the flow rate controlling portion 20A3 (when the amount of rotation of the valve rod 15 is controlled), the torque controlling portion 20A2 acquires, from the table TB, which is stored in the table storing portion 20C, the torque that corresponds to the differential pressure ΔP across the valve unit 14, detected by the differential pressure detecting portion 20B, and the opening θpv of the valve unit 14, detected by the valve opening detector 17. The torque controlling portion 20A2 then sends to the motor 16 a command (a torque output command) T so as to output this torque that has been acquired.

As a result, the output torque of the motor 16 is controlled so that the valve rod 15 will rotate with the appropriate torque in accordance with the differential pressure ΔP across the valve unit 14 and the degree of opening θpv of the valve unit 14 at that time.

Figure 6:
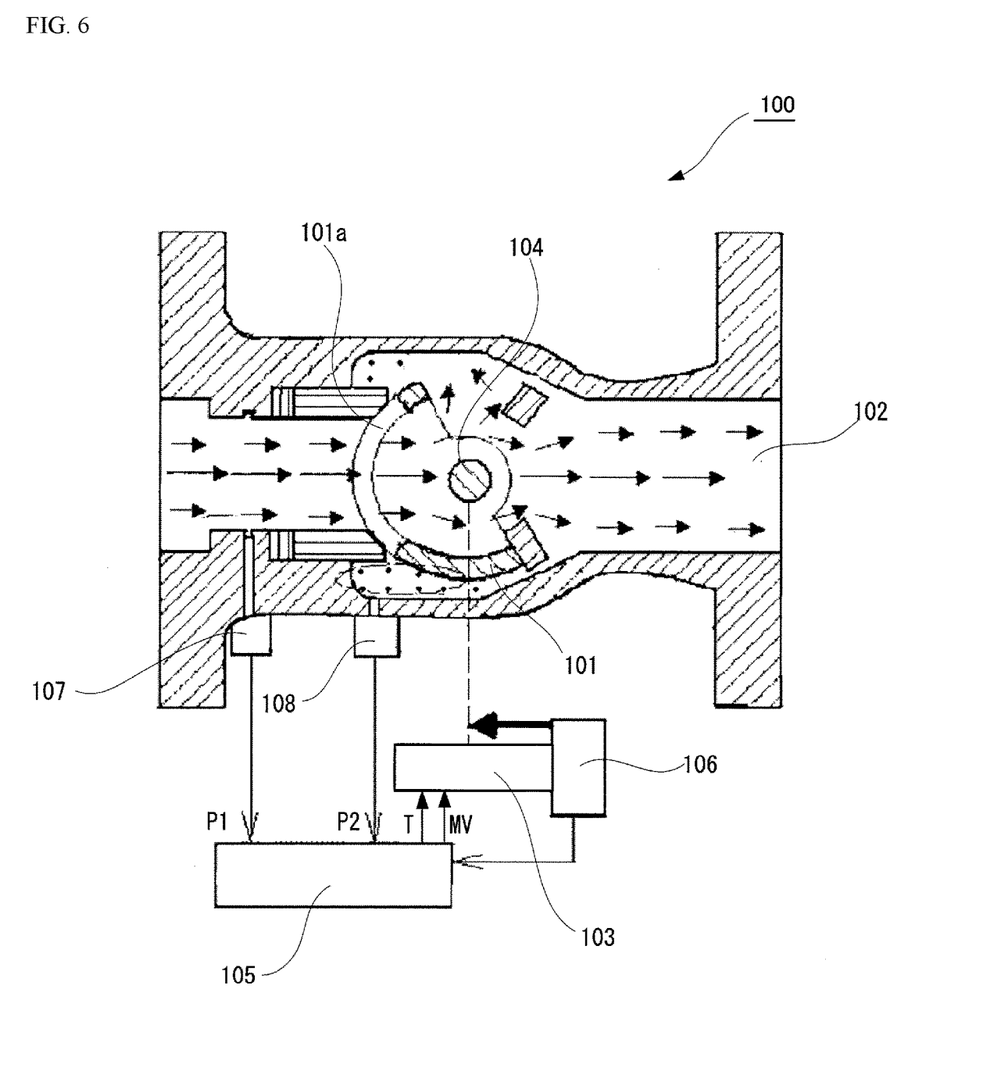
FIG. 6 is a diagram (a planner cross-sectional view) illustrating a specific example configuration of a rotary valve.

Note that while in the examples set forth above the explanations used, as an example, a rotary valve, where the rotational position of the valve unit was varied in accordance with rotation of the valve rod, it may be applied identically to a direct-acting valve as well, wherein the size of the gap between the flow path and the valve unit is varied in accordance with a reciprocating operation of the valve rod. FIG. 6 illustrates a planner cross-sectional view of a specific example configuration of a rotary valve, and FIG. 7 presents a specific example configuration (a side-face cross-sectional view) of a direct-acting valve.

In the rotary valve 100 illustrated in FIG. 6, the valve unit 101 has a window portion 101a through which the fluid flows from the primary side to the secondary side in the flow path 102. An actuator (a driving portion) 103 rotates the valve rod 104 centered on the axis thereof. The controlling portion 105 controls the amount of rotation and the output torque of the valve rod 104 through the actuator 103. In this rotary valve 100, the rotational position of the valve unit 101 is varied in accordance with the rotation of the valve rod 104, to vary the flow rate of the fluid that passes through the window portion 101a in accordance with the rotational position of the valve unit 101. Note that in the FIG. 6, 106 is a valve opening detector, 107 is a primary side pressure sensor, and 108 is a secondary side pressure sensor.

Figure 7:
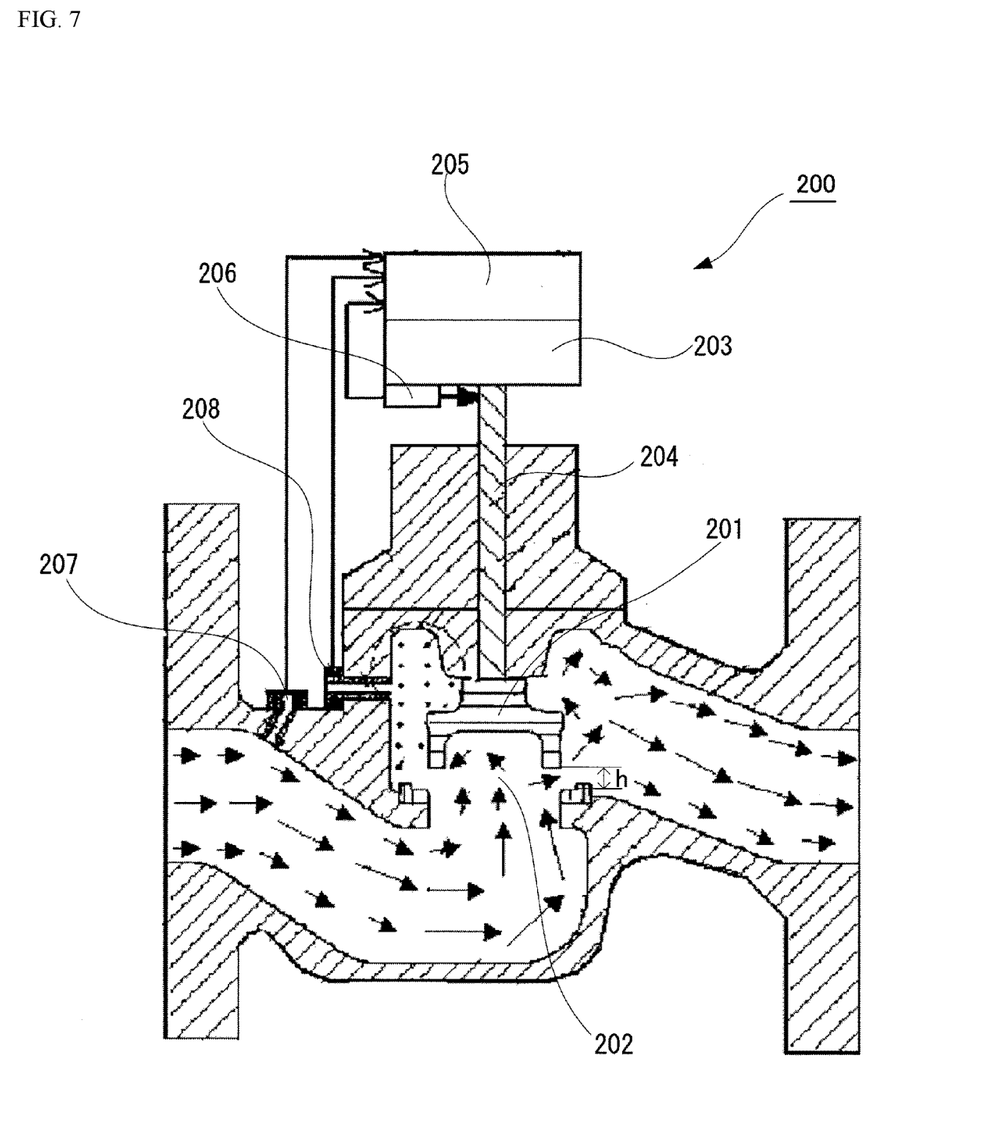
FIG. 7 is a diagram (a side-face cross-sectional view) illustrating a specific example configuration for a direct-acting valve.

In the direct-acting valve 200 illustrated in FIG. 7, the actuator (driving portion) 203 causes the valve rod 204 to undergo reciprocating operations in the axial direction thereof. The controlling portion 205 controls the manipulated variable that is the reciprocation of the valve rod 204, through the actuator 203. In the direct-acting valve 200, the size of the gap h between the flow path 202 and the valve unit 201 is varied in accordance with the reciprocating operation of the valve rod 204, to vary the flow rate of the fluid that passes through this gap between the flow path 202 in the valve unit 201 in accordance with the size of the gap h. Note that in the FIG. 7, 206 is a valve opening detector, 207 is a primary side pressure sensor, and 208 is a secondary side pressure sensor.

Moreover, note that while in the first two Examples, described above, the torques corresponding to the differential pressures ΔP across the valve unit 14 were acquired from tables TA, and in the further examples the torques corresponding to the differential pressures ΔP across the valve unit 14 and the openings Δpv of the valve unit 14 were acquired from the table TB (that is, while a table method was used), instead an equation may be established and these may be produced through calculation (that is, an arithmetic method may be used).

Note that while in the examples set forth above the explanations were for examples wherein air conditioners were used for the air-conditioning equipment, the air-conditioning equipment is not limited to being air conditioners. In particular, this may be applied to a flow rate controlling system for process control. Moreover, there is no limitation to cold water/hot water, but rather to the present invention may be applied to a variety of fluids, such as gasses.

Extended Examples

While the present disclosure has been explained above in reference to an example, the present disclosure is not limited to the example set forth above. The structures and details in the present disclosure may be varied in a variety of ways, as can be understood by one skilled in the art, within the scope of technology in the present disclosure.

What is claimed is:
1. A flow rate controlling valve comprising:
   a valve unit for adjusting the amount of opening of a flow path through which a fluid flows;
   a valve rod that is linked to the valve unit;
   a driver driving the valve rod;
   a differential pressure detector detecting, as a differential pressure across the valve unit, a differential pressure between a pressure of a fluid on a primary side of the valve unit and a pressure of a fluid on a secondary side of the valve unit;
   a differential pressure-torque non-transitory storage storing a relationship between the differential pressure across the valve unit and a torque that is to be outputted by the driving portion;
   a drive quantity controller controlling a drive quantity for the valve rod by the driver so that a fluid with a desired flow rate flows within the flow path; and
   a driving torque controller calculating a torque corresponding to the differential pressure across a valve unit, detected by the differential pressure detector, from a relationship stored in the differential pressure-torque non-transitory storage, to control a driving torque of the valve rod by the driver so as to output this torque.

2. The flow rate controlling valve as set forth in claim 1, further comprising:
   a valve opening detector detecting an actual opening of the valve unit from a driving position of the valve rod, wherein:
   the differential pressure-torque non-transitory storage stores a relationship between the differential pressure across the valve unit, an opening of the valve unit, and a torque that is to be outputted by the driver, wherein:

the driving torque controlling portion calculates, from a relationship stored in the differential pressure-torque non-transitory storage, a torque corresponding to the differential pressure across the valve unit, detected by the differential pressure detecting portion, and an actual opening of a valve unit, detected by the valve opening detector, to control a driving torque of the valve rod by the driving portion.

3. The flow rate controlling valve as set forth in claim 1, further comprising:

an actual flow rate controller calculating an actual flow rate of a fluid flowing in the flow path based on the differential pressure across a valve unit, detected by the differential pressure detector, wherein:

the drive quantity controller uses, as a measured value for a flow rate, an actual flow rate of the fluid that flows in the flow path, calculated by the actual flow rate calculator, to control a drive quantity of the valve rod by the driver so that this flow rate measured value will match a flow rate setpoint.

4. The flow rate controlling valve as set forth in claim 1, further comprising:

a valve opening detector detecting an actual opening of the valve unit from a driving position of the valve rod, wherein:

the drive quantity controller uses, as a valve opening measured value, an actual degree of opening of the valve unit, detected by the valve opening detector, to control a drive quantity of the valve rod by the driver so that this valve opening measured value will match a valve opening setpoint.

5. The flow rate controlling valve as set forth in claim 1, wherein:

the driver comprises a motor wherein an output torque can be varied.

6. The flow rate controlling valve as set forth in claim 1, wherein:

the valve unit has a window through which a fluid flows from the primary side to the secondary side of the flow path;

the driver causes the valve rod to rotate centered on an axis thereof;

the drive quantity controller controls an amount of rotation of the valve rod by the driver; and a rotational position of the valve unit is varied in accordance with the rotation of the valve rod, to vary the flow rate of the fluid that passes through the window in accordance with the rotational position of the valve unit.

7. The flow rate controlling valve as set forth in claim 1, wherein:

the driver causes the valve rod to undergo a reciprocating operation in an axial direction thereof;

the drive quantity controller controls a manipulated variable that is the reciprocation of the valve rod, by the driving operation; and the size of a gap between the flow path and the valve unit is varied in accordance with the reciprocating operation of the valve rod, to vary the flow rate of a fluid that passes through the gap between the flow path and the valve unit in accordance with the size of the gap.

* * * * *